United States Patent Office 3,471,448
Patented Oct. 7, 1969

3,471,448
POLYURETHANE PLASTICS
Wolfgang Heydkamp, Leverkusen, Germany, Hugo Wilms, deceased, late of Leverkusen, Germany, by Minna Marie Elli Freida Erika Wilms, heir, Leverkusen Germany, and Wilhelm Kallert, Cologne-Stammheim, and Dieter Dieterich, Leverkusen, Germany, assignors to Farbenfabriken Bayer Aktiengesellschaft, Leverkusen, Germany, a corporation of Germany
No Drawing. Filed May 18, 1966, Ser. No. 551,170
Claims priority, application Germany, May 20, 1965, F 46,101
Int. Cl. C08g 22/04
U.S. Cl. 260—75    4 Claims

ABSTRACT OF THE DISCLOSURE

Polyurethane polymers which are cross-linked by sulfur or peroxides are prepared by reacting an organic polyhydroxyl compound having a molecular weight of at least 800, an organic polyisocyanate and a chain extending agent having the formula

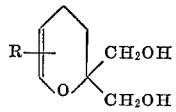

wherein R is hydrogen or methyl.

---

This invention relates to polyurethane plastics. More particularly, it relates to non-porous polyurethane plastics and a method of producing the same.

It is known to produce plastics which are crosslinked with sulphur or a peroxide and which are derived from polyhydroxyl compounds, polyisocyanates and glycols as chain extenders. It is advantageous to use those chain extenders which have olefinically unsaturated groupings. The components referred to in U.S. Patent 2,808,391 or in German Patent 955,995, are representative of this type of chain extenders. In the production of these plastics, the procedure expediently is first of all to form a rollable polyurethane composition which is similar to a crude rubber sheet and which is crosslinked in irreversible manner in a second processing step and while shaping. On account of the similarity between crude rubber and non-crosslinked polyurethane compositions, the processes and methods known in the rubber industry are used for the further processing.

It is therefore an object of this invention to provide improved polyurethane plastics. It is another object of this invention to provide an improved process of making polyurethane plastics. It is still another object of this invention to provide new crosslinking agents for polyurethane plastics. It is a further object of this invention to provide millable gums which are cured using either sulfur or organic peroxides.

The foregoing objects and others which will become apparent from the following description are accomplished in accordance with the invention generally speaking by providing polyurethane polymers capable of being crosslinked by sulphur of peroxides by reacting an organic polyhydroxy compound having a molecular weight of at least 800, an organic polyisocyanate and a chain extender having the general formula

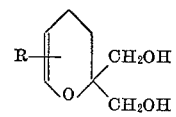

in which R represents hydrogen or methyl.

The use according to the invention, of these special 2,2 - bis - (hydroxymethyl-)-$\Delta^5$-dihydropyran derivatives yields plastics with a good range of physical values, the said plastics unexpectedly showing a good pressure deformation behavior. In addition, the incorporation of these chain extenders into polyurethane compositions, permits for the first time, a crosslinking with a so-called "free surface" carried out with peroxides. When using the prior known, olefinically unsaturated chain extenders in polyurethane compositions, it was not possible without taking particular precautionary steps to conduct the peroxidic crosslinking action in such a way that the surfaces of the molded element were also sufficiently crosslinked, this being associated with diffusion processes of the peroxide from the surface or with the oxygen inhibition of the radical reaction at the high temperature.

The extraordinarily good pressure deformation behavior of polyurethane molded elements especially vulcanized with sulphur can likewise not be produced with the prior known chain extenders. The diols can be used according to the invention show a high reactivity, which eventually leads to a high degree of crosslinking and to a good pressure deformation behavior and permits the use of a large number of different vulcanization recipes. As shown experimentally in Example 5, good vulcanization results were produced with a low sulphur cure recipe, this being a recipe which substantially fails with the prior known olefinically unsaturated chain extends. Also worth mentioning are the resistance of the products according to the process to oil and organic solvents, their low swellability in solvents, their resistance to air and ozone and their good low temperature stability, which is shown in a particularly low dynamic congealing temperature. The last mentioned value is measured by determining the dependence of the shearing modulus of the elastomer on the temperature.

Any suitable organic compound containing active hydrogen atoms which are reactive with NCO groups such as, for example, hydroxyl polyesters, polyhydric polyalkylene esters, polyhydric polythioethers, polyacetals and the like may be used.

Any suitable hydroxyl polyester may be used such as, for example, the reaction product of a polycarboxylic acid and a polyhydric alcohol. Any suitable polycarboxylic acid may be used in the preparation of the hydroxyl polyester such as, for example, adipic acid, succinic acid, sebacic acid, suberic acid, oxalic acid, methyl adipic acid, glutaric acid, pimelic acid, azelaic acid, phthalic acid, terephthalic acid, isophthalic acid, thiodipropionic acid, maleic acid, fumaric acid, citraconic acid, itaconic acid and the like. Any suitable polyhydric alcohol may be used in the reaction with the polycarboxylic acid to form a polyester such as, for example, ethylene glycol, propylene glycol, butylene glycol, neopentyl glycol, amylene glycol, hexanediol, bis-(hydroxymethyl-cyclohexane) and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters and the like. Any suitable polyester amide may be used such as, for example, the reaction product of a diamine or an amino alcohol with any of the compositions set forth for preparing polyesters. Any suitable amine may be used such as, for example, ethylene diamine, propylene diamine, tolylene diamine and the like. Any suitable amino alcohol such as, for example, beta-hydroxy ethyl-amine and the like may be used. Any suitable polyesters urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds.

Any suitable polyetherester may be used as the organic compound containing terminal hydroxyl groups such as, for example, the reaction product of an ether glycol and a polycarboxylic acid such as those mentioned above, with relation to the preparation of polyesters. Any suitable ether glycol may be used such as, for example, diethylene glycol, triethylene glycol, 1,4-phenylene-bis-hydroxy ethyl ether, 2,2'-diphenylpropane-4,4'-bis-hydroxy ethyl ether and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol, trimethylol propane, glycerine, pentaerythritol, hexanetriol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wutz in 1859 and in the "Encyclopedia of Chemical Technology," volume 7, pages 257–262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propyl sulfide, 4,4'-dihydroxy butyl sulfied, 1,4-(beta-hydroxy ethyl)phenylene dithioether and the like.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used.

The organic compound containing active hydrogen atoms should be preferably substantially linear or only slightly branched and have molecular weight of at least about 800 and for best results, a molecular weight of from about 1800 to about 3000, an hydroxyl number of from about 75 to about 35 and an acid number less than about 2.

Any suitable organic diisocyanate may be used in reaction with the organic compound containing active hydrogen atoms to produce thermoplastically processable polyurethane polymers such as, for example, ethylene diisocyanate, ethylidene diisocyanate, propylene diisocyanate, butylene diisocyanate, hexamethylene diisocyanate, cyclopentylene - 1,3 - diisocyanate, cyclohexylene-1,4-diisocyanate, cyclehexylene-1,2-diisocyanate, 2,4-toluylene 2,6-toluylene diisocyanate, dimeric toluylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate and the like. It is preferred that aromatic diisocyanates be used and for best results, 4,4'-diphenylmethane diisocyanate or toluylene diisocyanate have proven to be especially suitable.

Expediently, 3 to 15% by weight and preferably 5 to 10% by weight (based on the prepared polyurethane composition) of the chain extenders are used according to the invention. The chain extenders are the unsubstituted and the various isomeric methyl-substituted derivatives, which are obtainable with a satisfactory yield by synthesis processes which are known per se (U.S. Patent Nos. 2,980,703 and 3,047,586, and also Journal of Organic Chemistry, volume 26, page 2106 et seq. (1961). It is preferred to use the unsubstituted compound, that is the 2,2-bis-(hydroxymethyl-)-$\Delta^5$-dihydropyran.

The reaction of the polyhydroxyl compound of relatively high molecular weight with the polyisocyanate and the pyran derivatives takes place in a manner known per se. For example, the dehydrated polyhydroxyl compounds can be converted with an excess of the diisocyanate in a first stage at 80 to 140° C., preferably at 120 to 130° C., and the pyran derivative can be introduced at 50 to 130° C., preferably 90 to 100°. The highly viscous melt is poured into molds and is kept for approximately 6 to 48 hours and preferably 12 to 24 hours at 100°. The stoichiometric ratio between isocyanate and hydroxyl groups (polyhydroxyl compounds plus pyran derivative) should expediently be 0.9 to 1.2 and preferably 0.95 to 1.05. It is also possible to mix the polyhydroxyl compound of higher molecular weight and the diol and to react these jointly with the diisocyanate. However, it is also possible to proceed by reacting the pyran derivative with the total quantity of polyisocyanate at, for example, 60 to 90° C. and only then to introduce the polyhydroxyl compound (after careful dehydration). The concurrent use of inert solvents may be desirable in special cases, solvents, for example, benzene, toluene, xylene, chlorobenzene, nitrobenzene, tetrahydrofuran, dioxane and chlorinated hydrocarbons being suitable.

Any suitable chain extending agent containing active hydrogen atoms which are reactive with NCO groups and having a molecular weight less than about 500 may be used concurrently with the pyran derivatives, such as, for example, ethylene glycol, propylene glycol, butylene glycol, 1,4-butanediol, butenediol, butynediol, xylylene glycol, amylene glycol, neopentyl glycol, 2,3-butanediol, 1,4-phenylene-bis-(beta-hydroxy ethyl ether), 1,3-phenylene-bis-(beta-hydroxy ethyl ether), bis-(hydroxy methyl-cyclohexane), hexanediol, diethylene glycol, dipropylene glycol and the like; polyamines such as, for example, ethylene diamine, propylene diamine, butylene diamine, hexamethylene diamine, cyclohexylene diamine, phenylene diamine, tolylene diamine, xylylene diamine, 3,3'-dichlorobenzidene, 3,3'-dinitrobenzidene, 4,4'-methylene - bis(2-chloroaniline), 3,3-dichloro-4,4'-biphenyl diamine, 2,6-diamino pyridine, 4,4'-diamino diphenylmethane and the like; alkanol amines such as, for example, ethanol amine, aminopropyl alcohol, 2,2-dimethyl propanol amine, 3-amino cyclohexyl alcohol, p-amino benzyl alcohol and the like; water, hydrazine, substituted hydrazines such as, for example, N,N'-dimethyl hydrazine, 1,6-hexamethylene-bis-hydrazine, carbodihydrazide, hydrazides of dicarboxylic acids and disulfonic acids such as adipic acid dihydrazide, oxalic acid dihydrazide, isophthalic acid dihydrazide, thiodipropionic acid dihydrazide, tartaric acid dihydrazide, 1,3-phenylene-disulfonic acid dihydrazide, omega-amino-capronic acid dihydrazide, gamma-hydroxy butyric hydrazide, bis-semi-carbazide, bis-hydrazine carbonic esters of glycols such as many of the glycols heretofore mentioned and the like.

The crosslinking is effected by sulphur or peroxide vulcanization. With sulphur vulcanization, abrasion-resistant carbon black, talcum or silicates, sulphur and vulcanization auxiliaries may be added to the polyurethane composition, for example, on a roller at 55 to 90° C. and in the manner in which they are also usually employed when vulcanizing crude rubber. The vulcanization takes place between 120 and 190° C. under a pressure of 1 to 200 atm. gauge. The vulcanization times are generally between 5 minutes and 1 hour. The crosslinked shaped elements can be removed from the presses while hot and immediately show the final physical properties. They have smooth surfaces and are vulcanized in a completely homogeneous manner.

For peroxide crosslinking, organic peroxide can be incorporated at 50 to 90° C. into a like polyurethane composition on the roller, after also in this case, having previously incorporated therein, by rolling, fillers such as carbon black, talcum, silicates, magnesium carbonate or calcium carbonate and special components which promote a relatively high crosslinking. The vulcanization is expediently carried out between 120 and 210° C., preferably at 140 to 180° C., under pressure. The extraordinary reactivity of the crosslinking system according to the invention also permits vulcanization with a free surface. Any suitable peroxide may be used such as, for example, dialkyl, diarylalkyl and alkylaryl peroxides, such as, di-tert.-butyl peroxide, dicumyl peroxide, tert.-butyl-cumyl peroxide, alpha,alpha-di-(tert.-butyl peroxide)-diisopropylbenzene, 1,1-bis-(tert.-butyl peroxide)-3,3,5-trimethylcyclohexane and 4,4',4'-tetra-(tert.-butyl peroxy)-2,2-dicyclohexylpropane. The peroxides are generally used in quantities of 0.5 to 8.0% by weight.

Solutions of the polyurethane compositions in one of the aforementioned solvents, after peroxide has been added thereto, again in an amount of 0.5 to 8.0% by weight, based on the polyurethane composition, also yield crosslinked elastomers on heating. The crosslinking in solvents permits foils to be produced with a thickness of a few millimeters.

Both sulphur vulcanization and peroxide vulcanization permit the incorporation of dyestuffs, plasticizers, oxidation inhibitors, age resisters, blowing agents and components capable of preventing attack by bacteria into the still non-crosslinked polyurethane compositions, in addition to the aforementioned fillers and the agents required for the crosslinking.

The process according to the invention is recommended in all those cases where highly crosslinked products, which are only to be given their final form during the crosslinking process, are desired. The plastics are of interest for the manufacture of pipes, tires, belts and flexible tubes, as footwear, as insulating material and as coating substances for textile fabrics and fleeces.

The invention is further illustrated but not limited by the following examples in which parts are by weight unless otherwise specified.

Example 1

About 150 parts of 2,2-dimethyloldihydropyran are added to about 1750 parts of an adipic acid-butanediol-neopentyldiol polyester (OH number 64) after removal of the last traces of water at about 100° C., and about 525 parts of diphenylmethane-4,4'-diisocyanate are incorporated by stirring. After about 20 minutes at about 130° C., the viscous melt is poured into a mold and kept for about 24 hours at about 100° C. The Defo value measured at about 80° C. is 2100/19. About 1.0 part of stearic acid, about 30 parts of activated carbon black, about 1.5 parts of sulphur, about 5.0 parts of activated zinc oxide, about 3.0 parts of dibenzoylthiazyldisulphide, about 1.0 part of 2-mercaptobenzthiazole and about 0.5 part of zinc chloride complex of dibenzthiazyldisulphide are rolled into this crude sheet, per about 100 parts of material. Vulcanization at about 150° C. under about 4.0 atm. gauge supplies crosslinked molded elements with the physical properties of Table I.

TABLE I (1) Vulcanization period lasting 30 minutes.
(2) Vulcanization period lasting 60 minutes.

| | (1) | (2) |
|---|---|---|
| Tensile strength, kp./cm.² (DIN 53 504) | 174 | 159 |
| Elongation at break, percent | 410 | 370 |
| Modulus (300% elongation), kp./cm.² | 124 | 154 |
| Permanent elongation, percent | 20 | 12 |
| Elasticity, percent (DIN 53 512) | 18 | 19 |
| Structural strength, kp | 17 | 14 |
| Shore Hardness A (20°/75°) (DIN 53 505) | 66/47 | 70/50 |

Example 2

The crude sheets obtainable in a manner similar to Example 1 from about 1750 parts of adipic acid-butanediol-neopentyldiol polyester (OH number 64), about 227 parts of 2,2-dimethyloldihydropyran and about 624 parts of diphenylmethane-4,4'-diisocyanate has a Defo value of 674/14 (80°).

Using the same vulcanization recipe as in Example 1, molded elements are formed the physical properties of which are set out in Table II, once again after about 30 minutes vulcanization period in Column 1 and after about 60 minutes vulcanization period in Column 2 at 150° C./ 4.0 atm. gauge.

TABLE II

| | (1) | (2) |
|---|---|---|
| Tensile strength, kp./cm.² | 194 | 189 |
| Elongation at break, percent | 325 | 245 |
| Modulus (300% elongation), kp./cm.² | 183 | |
| Elasticity, percent | 11 | 12 |
| Permanent elongation, percent | 13 | 9 |
| Structural strength, kp | 19 | 18 |
| Shore hardness A (20°/75°) | 77/56 | 78/58 |

Example 3

From about 1975 parts of anhydrous adipic acid-ethanediol-butandiol mixed ester (OH number 56.5), about 160 parts of 2,2-dimethylol-dihydropyran, about 26 parts of butane-1,4-diol and about 605 parts of diphenylmethane-4,4'-diisocyanate, there are obtained at 125 to 130° C. and after 30 minutes, a highly viscous melt which, on being kept for about 12 hours at about 100° C. changes into a crude sheet with a Defo value of 825/17 (at 80°). After about 0.5 part of stearic acid, about 0.5 part of cadmium stearate, about 30 parts of carbon black, about 2.0 parts of sulphur, about 4.0 parts of dibenzylthiazyl disulphide, about 2.0 parts of 2-mercaptobenzothiazole and about 1.0 part of zinc chloride complex of dibenzothiazyl disulphide have been incorporated by rolling, per about 100 parts of crude sheet, vulcanization takes place for about 30 minutes at about 150° C. and at about 4.0 atm. gauge. The molded elements have a tensile strength of 257 kp./cm.², an elongation at break of 367%, a permanent elongation of 6% one minute after tearing, a structural strength of 13 kp., an elasticity of 20%, a Shore A hardness of 77 (20°) and a DIN abrasion of 51. The pressure of deformation residue according to DIN 53 517 with constant deformation is 28% after 24 hours at 70° C., 57.2% at 100° C. and 90.8% at 125° C. The congealing temperature ($T_{50}$-value) is −16° C.

Example 4

A rollable crude sheet is prepared from about 1750 parts of anhydrous adipic acid-butanediol-neopentyldiol polyester (OH number 64), about 87 parts of 2,2-dimethyloldihydropyran, about 24 parts of butanediol and about 318 parts of hexamethylene diisocyanate in about 45 minutes at about 125 to about 130° C. and after being kept for about 20 hours at about 100° C. The Defo value is 500/19 at 80° C. Batches of 100 parts of this polyurethane composition have incorporated thereinto, on a roller, about 0.5 part of steric acid, about 0.5 part of cadmium stearate, about 30 parts of carbon black, about 2.0 parts of sulphur, about 4.0 parts of dibenzoylthiazyl disulphide, about 2.0 parts of 2-mercaptobenzthiazole and about 1.0 part of zinc chloride complex of dibenzthiazyl-disulphide. On being vulcanized at about 151° C./6.0 atm. gauge, there is formed in about 30 minutes a molded element which has the following physical properties:

Tensile strength _____ kp./cm.$^2$__ 165
Elongation at break _____ percent__ 503
Permanent elongation of 10% (one minute after tearing).
Ring structure _____ kp__ 23
Elasticity _____ percent__ 42
Shore hardness A 58 (20°).
DIN abrasion _____ 103

By measuring the shearing modules as a function of the temperature, there is produced a damping maximum at −36° to −38° C.; the dynamic congealing temperature is in the region of −42° C. The pressure deformation residue with constant deformation (DIN 53 517) showed a value of 38.4% after 24 hours at 70° C. and 75.1% after 24 hours at 100° C.

Example 5

From about 1770 parts of anhydrous adipic acid-butanediol-neopentylglycol mixed ester (OH number 63.5) and about 325 parts of hexamethylene diisocyanate, a melt of a medium viscosity is prepared in about 15 minutes at about 125 to about 130° C. and the mixture of about 14 parts of butane-1,4-diol and about 106 parts of 2,2-dimethyloldihydropyran is incorporated thereinto at about 100° C. After about another 15 minutes, the melt is poured into molds and heating is continued for about 24 hours at about 100° C. The tough material which can be satisfactorily rolled shows a Defo value of 520/20 at 80° C.

(a) About one-third of this crude sheet is mixed on the roller with about 0.5 part of stearic acid, about 0.5 part of cadmium stearate, about 30 parts af activated carbon black, about 2.0 parts of sulphur, about 4.0 parts of dibenzoylthiazyl disulphide, about 2.0 parts of 2-mercaptobenzthiazole and about 0.5 part of zinc chloride complex of dibenzthiazyl disulphide to about 100 parts of substance in each case and vulcanized for about 30 minutes in molds at about 151° C./6.0 atm. gauge. The physical properties are set out in Column 1 of Table III.

(b) In the second third of the crude sheet and to about 100 parts of material, there are incorporated by rolling about 0.5 part of stearic acid, about 30 parts of activated carbon black, about 1.0 part of active zinc oxide, about 0.6 part of sulphur, about 4.0 parts of benzthiazyl-2-cyclohexylsulphenamide, about 2.0 parts of 2,4-dimercaptothiozole and about 1.0 part of tetramethylthiuram disulphide, vulcanization at about 151° C./6.0 atm. gauge supplies after about 30 minutes, molded elements which have the physical properties set out in Column 2 of Table III.

(c) The last third of the crude sheet is rolled with the same quantities of vulcanization auxiliaries as in (2), with the single difference that about 0.3 part of sulphur are used instead of the about 0.6 part mentioned therein. The physical properties of the molded elements, vulcanized for about 30 minutes at 151° C./6.0 atm. gauge, are set out in Column 3 of Table III.

TABLE III

| | (1) | (2) | (3) |
|---|---|---|---|
| Tensile strength, kp./cm.$^2$ | 178 | 175 | 162 |
| Elongation at break, percent | 478 | 540 | 400 |
| Permanent elongation, percent | 10 | 9 | 10 |
| Elasticity, percent | 44 | 37 | 35 |
| Structural strength, kp | 14 | 17 | 19 |
| Shore A hardness (20°) | 61 | 60 | 62 |
| DIN-abrasion | 94 | 126 | 119 |
| Pressure deformation residue (DIN 53 517): | | | |
| 24 hours, 70° (percent) | 35.0 | 37.3 | 38.3 |
| 24 hours, 100° (percent) | 74.4 | 63.1 | 59.6 |
| 24 hours, 125° (percent) | 97.4 | 97.6 | 96.7 |
| $T_{50}$-value (° C.) | −10 | | |
| Dynamic congealing temperature (° C.) | −40 | −41 | −41 |

Example 6

After dehydration at about 130° C./12 mm. for about 1½ hours, about 572 parts of diphenylmethane-4,4′-diisocyanate are added to about 2000 parts of polypropylene glycol ether (OH number 56) at about 90° C. and stirring takes place for about one hour at about 125 to about 130° C. About 160 parts of 2,2-dimethyloldihydropyran are added to the strongly thickened melt, which is stirred and poured into a mold. The crude polyurethane is treated for about 24 hours at about 100° C. and then has a Defo value of 280/27 (80°).

Using the same vulcanization recipe as in Example 1, about 30 minutes pressing at 150° C./6.0 atm. gauge produces molded elements which show a tensile strength of 72 kg./cm.$^2$, an elongation at break of 350%, a rebound elasticity of 21%, a permanent elongation of 11% and a Shore A hardness of 48 (20°).

Example 7

After adding about 144 parts of 2,2-dimethyloldihydropyran and about 522 parts of diphenylmethane-4,4′-diisocyanate at about 120 to about 130° C. to about 3000 parts of polybutylene glycol ether (OH number 37.5) there is obtained from the latter, after being kept for about 24 hours at about 100° C., a crude sheet with the Defo value 850/24 (80°). After rolling with the vulcanization agent indicated in Example 1, highly elastic molded elements are formed at about 150° C./4.0 atm. gauge and the physical properties thereof are described in Table IV. The values listed in Column 1 are those obtained after a vulcanization period of about 30 minutes and those in Column 2 after a vulcanization period of about 60 minutes.

TABLE IV

| | | |
|---|---|---|
| Tensile strength, kp./cm.$^2$ | 223 | 220 |
| Elongation at break, percent | 510 | 460 |
| Modulus (300% elongation), kp./cm.$^2$ | 120 | 133 |
| Modulus (300% elongation), kp./cm.$^2$ | 220 | |
| Elasticity, percent | 56 | 56 |
| Permanent elongation, percent | 12 | 11 |
| Structural strength, kp | 26 | 18 |
| Shore A hardness (20°/75°) | 67/— | 72/61 |

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A polyurethane, capable of being cross-linked by heating same in the presence of sulfur or a peroxide, said polyurethane being prepared by reacting (1) a polyhydroxyl polymeric compound having (i) a molecular weight of at least 800 and (ii) active hydrogen atoms, (2) an organic polyisocyanate, and (3) a chain extender having the general formula:

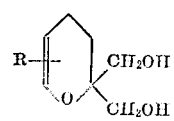

wherein R is hydrogen or a methyl radical, the ratio of (1), (2), and (3) being such that the ratio of —NCO to —OH is between about 0.9:1.0 and 1.2:1.0.

2. The polyurethane of claim 1 wherein the chain extender is present in an amount of from about 3 percent to about 15 percent by weight, based on the weight of the polyurethane.

3. The polyurethane of claim 1 wherein R is hydrogen.

4. The product of claim 1 wherein the chain extender is 2,2-bis(hydroxymethyl)-$\Delta^5$-dihydropyran.

References Cited

UNITED STATES PATENTS

| | | | |
|---|---|---|---|
| 2,808,391 | 10/1957 | Pattison | 260—77.5 |
| 2,929,800 | 3/1960 | Hill | 260—77.5 |
| 2,980,703 | 4/1961 | Dunlop et al. | 260—345.9 |
| 2,982,790 | 5/1961 | Theiling et al. | 260—635 |
| 3,012,993 | 12/1961 | Rogan | 260—77.5 |
| 3,022,256 | 2/1962 | Barnes et al. | 260—2.5 |
| 3,047,586 | 7/1962 | Dunlop et al. | 260—340.9 |
| 3,061,574 | 10/1962 | Smith | 260—37 |
| 3,219,633 | 11/1965 | Boussu et al. | 260—75 |

FOREIGN PATENTS

| | | |
|---|---|---|
| 672,178 | 10/1963 | Canada. |
| 1,005,722 | 4/1957 | Germany. |
| 1,076,359 | 2/1960 | Germany. |
| 1,100,944 | 3/1961 | Germany. |
| 1,348,959 | 12/1963 | France. |

DONALD E. CZAJA, Primary Examiner

M. J. WELSH, Assistant Examiner

U.S. Cl. X.R.

260—47, 77.5